US009258138B2

(12) United States Patent
Kesling (10) Patent No.: US 9,258,138 B2
(45) Date of Patent: Feb. 9, 2016

(54) UNIDIRECTIONAL CODING FOR BIDIRECTIONAL DATA BUS RADIO FREQUENCY INTERFERENCE MITIGATION

(71) Applicant: Intel Corporation, Santa Clara, CA (US)

(72) Inventor: William Dawson Kesling, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 14/139,807

(22) Filed: Dec. 23, 2013

(65) Prior Publication Data

US 2015/0180679 A1   Jun. 25, 2015

(51) Int. Cl.
*H04B 1/12* (2006.01)
*H04L 12/40* (2006.01)
*H04L 1/00* (2006.01)
*H04L 25/08* (2006.01)

(52) U.S. Cl.
CPC ........ *H04L 12/40032* (2013.01); *H04L 1/0011* (2013.01); *H04B 1/12* (2013.01); *H04L 25/08* (2013.01)

(58) Field of Classification Search
CPC .................................. H04B 1/12; H04L 25/08
USPC .................................................. 375/296, 295
See application file for complete search history.

(56) References Cited

U.S. PATENT DOCUMENTS

| | | | | |
|---|---|---|---|---|
| 4,072,915 | A * | 2/1978 | Mitchell | 333/194 |
| 5,148,427 | A * | 9/1992 | Buttle et al. | 370/291 |
| 5,668,648 | A * | 9/1997 | Saito et al. | 359/9 |
| 6,438,159 | B1 * | 8/2002 | Uber et al. | 375/225 |
| 2004/0164334 | A1 * | 8/2004 | Masleid et al. | 257/296 |
| 2010/0174887 | A1 * | 7/2010 | Pawlowski | 712/36 |
| 2015/0003506 | A1 * | 1/2015 | Kesling et al. | 375/224 |

* cited by examiner

*Primary Examiner* — Michael Neff
(74) *Attorney, Agent, or Firm* — International IP Law Group, P.L.L.C.

(57) ABSTRACT

An integrated circuit chip can include an interference mitigator. The interference mitigator can be to modify encoding to generate a cancellation pattern for optimum cancellation of radio frequency interference (RFI) at the effective mid-point of the data bus. The interference mitigator can also be to transmit the generated cancellation pattern across the data bus to cancel the radio frequency interference.

22 Claims, 4 Drawing Sheets

UNIDIRECTIONAL CODING FOR BIDIRECTIONAL DATA BUS RADIO FREQUENCY INTERFERENCE MITIGATION

TECHNICAL FIELD

The present techniques relate generally to radio frequency interference (RFI). In particular, the present techniques relate to mitigating radio frequency interference.

BACKGROUND

Within a computing system, data signals can be transmitted along data buses between components of the computing system. These components can include memory devices and input/output (I/O) devices, among others. These data buses can include memory input/output (I/O), Peripheral Component Interconnect Express (PCIe), and Universal Serial Bus (USB), among others. The data signals can generate radio frequency interference (RFI). This interference can affect a variety of radios within the computing system, such as WiFi, cellular, or GPS, and can disrupt normal reception of desired radio signals.

BRIEF DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION OF SPECIFIC EMBODIMENTS

Examples disclosed herein provide techniques for mitigating radio frequency interference. Data bus signals which result in radio interference can include a single lane of binary data, or groups of multiple lanes. The spectral magnitude and phase of the interference can be determined over specific time intervals. The victim radio is normally only affected by a narrow portion of this interference spectrum, which lies within the radio receiver's bandwidth. The interference can be approximated by the spectral component at the radio center frequency. This spectral component can be described as a phasor, where the phasor is proportional to the value of the interference spectrum taken at the radio frequency. In some cases, it is convenient to represent a phasor as a vector in the complex plane. The effect of an interference phasor on the received radio signal can be minimized using data encoding techniques which manipulate the bus data pattern.

Encoding can involve determining the interference phasor of a particular bus data pattern or patterns and making data coding decisions to reduce the magnitude of the net phasor over some time interval. Suitable time intervals for modern radios range from microseconds to milliseconds. Specific encoding techniques for spectral control can include block coding, bit stuffing, burst timing or gap insertion, and selective data inversion, among others. Many data buses are bidirectional with interference originating from both ends of the bus. In order to mitigate interference from both ends of the bus, encoding can be utilized from both ends of the bus. However, in order to mitigate interference from both ends of a bus, large amounts of time and money can be spent validating interoperability with third party components included in the computing system. In addition, encoding abilities cannot be included in some components of the computing system in practice.

A coding solution which can be implemented from only one end of such bidirectional buses is described. The coding solution includes modifying encoding, using a phase correction factor, for optimum cancellation of interference. Because this coding solution can be implemented from only one end of a bidirectional bus, radio interference from incoming bus data originating with another system component that does not support encoding can be cancelled. In addition, bus interference with radio reception can be reduced in the most system-efficient way by placing all new circuitry in the location of the computing system having the lowest transistor area, lowest transistor cost, lowest transistor power and/or the best transistor speed. Additionally, changes to industry standards can be reduced, shortening system development time and enabling faster implementations of new systems. Further, the coding solution minimizes time and costs spent validating interoperability with third party components included in the computing system.

Figure 1:
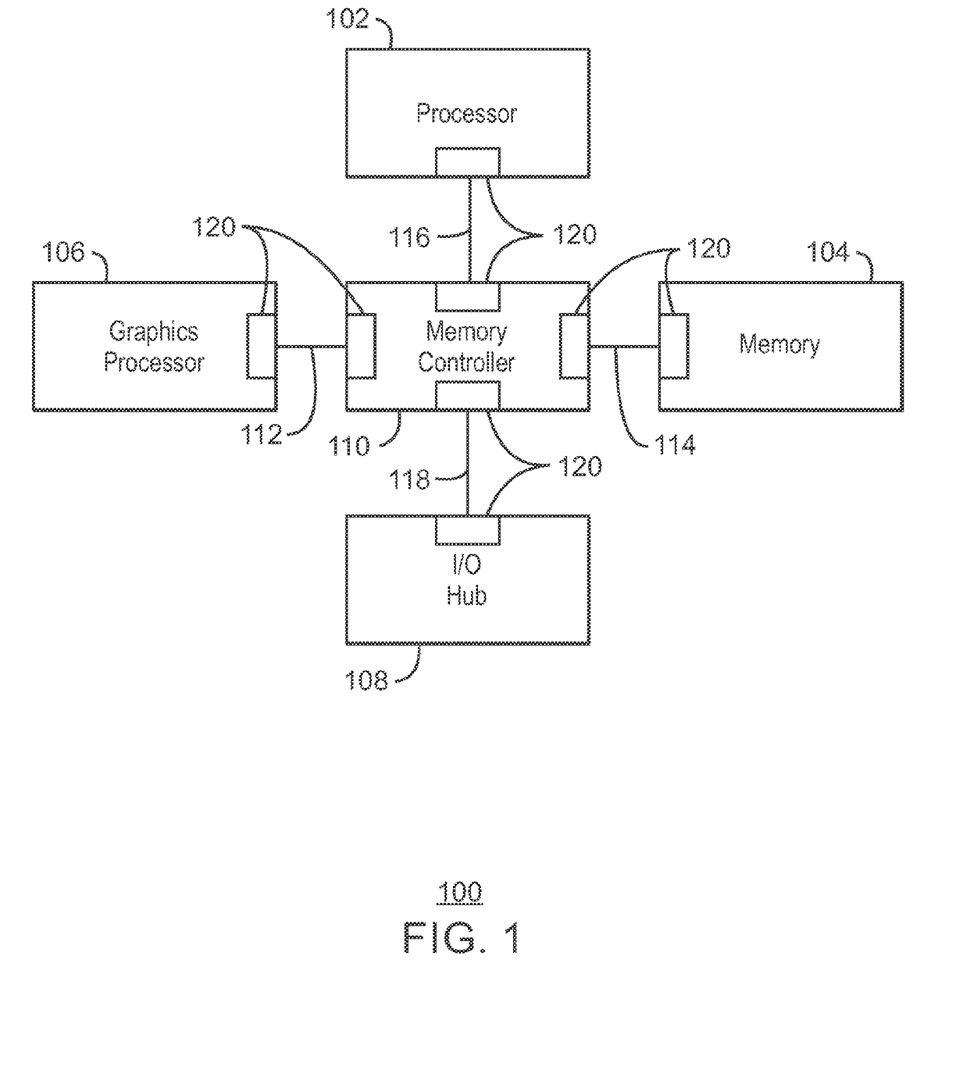
FIG. 1 is a block diagram of an example of a computing system.

FIG. 1 is a block diagram of an example of a computing system 100. The computing system 100 can be, for example, a mobile phone, laptop computer, ultrabook, desktop computer, server, or tablet computer, among others. The computing system 100 can include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 can be implemented as Complex Instruction Set Computer (CISC) or Reduced Instruction Set Computer (RISC) processors, x86 Instruction set compatible processors, multi-core, or any other microprocessor or central processing unit (CPU). In some examples, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store computer-readable instructions that, when executed by the processor, direct the processor to perform various operations in accordance with examples described herein.

The computing system 100 can also include a graphics processor 106 that processes computer generated graphics. The graphics processor 106 is configured to process memory related to the generation of graphics to be sent to a display (not shown). The display can be a built-in component of the computing system 100 externally connected to the computing system 100. The computing system 100 can also include an I/O hub 108 used to connect and control additional I/O devices (not shown), such as radio modems, network interface controllers, memory storage devices, user input devices, among others. The I/O devices coupled to the I/O hub 108 can be built-in components of the computing system 100, or can be devices that are externally connected to the computing system 100.

The computing system 100 can also include a memory controller hub 110 that handles communications between the processor 102, memory 104, graphics processor 106, and I/O hub 108. Communications between the various components of the computing system 100 can be performed over various data buses. For example, the graphics processor 106 can be coupled to the memory controller 110 through a graphics bus 112. The memory 104 can be coupled to the memory controller 110 through a memory bus 114. The data bus between the processor 102 and the memory controller 110 can be referred to as the front side bus 116. The data bus between the memory controller 110 and the I/O hub 108 can be referred to as the internal bus 118.

In some examples, the processor 102, graphics processor 106, memory device 104, memory controller 110, and I/O hub 108 can be separate integrated circuit chips coupled to a mother board. In some examples, one or more of the processor 102, graphics processor 106, memory device 104, memory controller 110, and I/O hub 108 can be included in a multi-chip module (MCM), multi-chip package (MCP), or system-on-a-chip (SoC). Depending on the design considerations of a particular implementation, the signal lines of the one or more of the buses 112, 114, 116, 118 can be disposed, at least in part, on one or more circuit boards.

The computing system 100 also includes an interference mitigator 120. The interference mitigator 120 employs uni-directional encoding to mitigate radio frequency interference (RFI) created by data travelling along a data bus 112, 114, 116, 118, such as a bidirectional data bus. In an example, the interference mitigator 120 is located at a single end of a data bus. The interference mitigator 120 can be located at only a single end of the data bus because the interference mitigator 120 is capable of mitigating interference due to bus data that is both sent and received at the end of the bus at which the interference mitigator 120 resides. As a data pattern travels along the data bus 112, 114, 116, 118 to the receiving component where the interference mitigator 120 resides, a cancellation pattern is transmitted back across the data bus 112, 114, 116, 118 by the receiving component to cancel interference patterns caused by the data pattern travelling along the bus 112, 114, 116, 118. The interference mitigator 120 applies a phase correction factor to the unidirectional encoding to mitigate the RFI. The phase correction factor compensates for the different direction of travel between the data pattern and the cancellation pattern. Applying the phase correction factor includes choosing a cancellation pattern to mitigate the RFI with this compensation.

A respective interference mitigator 120 can be coupled to or included in any component of the computing device 100 that transmits data over a data bus 112, 114, 116, 118, such as a bidirectional data bus. For example, the interference mitigator 120 can be included in the processor 102, graphics processor 106, memory device 104, memory controller 110, and/or I/O hub 108, among others. In another example, the interference mitigator 120 can be included in a single component of the computing system 100, such as the memory controller 110.

It is to be understood the block diagram of FIG. 1 is not intended to indicate that the computing system 100 is to include all of the components shown in FIG. 1 in every case. Further, any number of additional components can be included within the computing system 100, depending on the details of the specific implementation.

Figure 2:
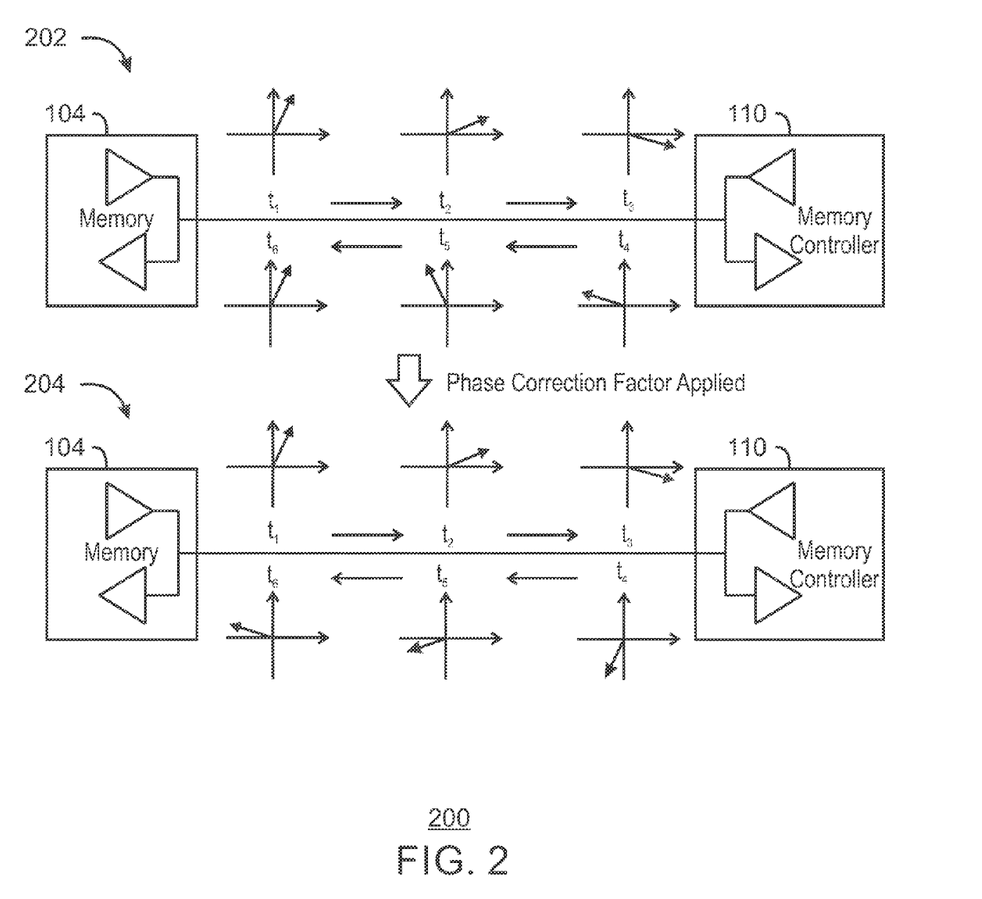
FIG. 2 is a diagram of an example of the effect of the phase correction factor on radio frequency interference mitigation with unidirectional encoding on bidirectional data buses.

FIG. 2 is a diagram 200 illustrating the effect of the phase correction factor on radio frequency interference (RFI) mitigation with unidirectional encoding on bidirectional data buses. Present encoding techniques can be used to cancel noise from incoming data by calculating its interference phasor and generating an outgoing data pattern with a phasor that will tend to cancel the interference phasor. An example of this encoding technique is illustrated in model 202.

In this example, memory 104 transmits a read data pattern along a data bus to the memory controller 110. The read data pattern is sent from memory 104 at time $t_1$ and arrives at the memory controller (MC) at time $t_3$. The interference phasors of the data pattern at $t_1$ and $t_3$, as well as at intermediate time $t_2$, are shown in the complex plane in the model 202. The propagation delay of the data bus is the difference between $t_3$ and $t_1$ ($t_{PD}=t_3-t_1$). As illustrated in the model 202, the interference phasor rotates clockwise as data propagates toward the memory controller 110. The interference phasor rotates according to the Fourier transform time-shift property, represented by Equation 1, where $f_{radio}$ is the interference frequency and $\Delta t$ is the propagation delay between two points of interest.

$$\Delta\emptyset=-2\pi f_{radio}\cdot\Delta t \quad \text{(Eq. 1)}$$

An outgoing data pattern with a phasor (i.e., a cancellation phasor) that will tend to cancel the interference phasor of the read data pattern can be generated and transmitted back across the data bus to the memory 104. The cancellation phasor is generated at time $t_4$. The cancellation phasor at $t_4$ has similar amplitude but opposite phase angle to the interference phasor at $t_3$. Although $t_4$ is generally later than $t_3$, cancellation of interference at the memory controller end of the bus is effective when the total delay between the cancellation and interference, $t_{C-I}$, is less than a radio symbol time or roughly one over the radio receiver's channel bandwidth. This delay constraint is easily satisfied in modern systems. At the right end of the bus, this total delay is just the encoder turn-around time, $t_{TA}=t_4-t_3$. The cancellation phasor also rotates as it travels back toward the memory 104, as illustrated by model 202 (i.e., $t_4$ to $t_6$).

This method of RFI cancellation works well when the data and cancellation patterns travel in the same direction as in normal uni-directional encoding. However, cancellation of the interference phasor with a cancellation phasor is normally only effective on very short data buses when the cancellation pattern travels in the opposite direction to the interfering data pattern. This is because the relative phase difference between the interference phasor and the corresponding cancellation phasor is not constant, but varies along the bus. The resulting phase variation between the interference and cancellation phasors can reduce or even reverse the intended RFI mitigation. As illustrated in model 202, the cancellation phasor at $t_4$ is the opposite of the interference phasor at $t_3$, effectively cancelling the interference phasor at $t_3$. However, as the cancellation phasor travels further from the memory controller 110, the phase variation increases and the cancellation phasor at $t_5$ fails to cancel the interference phasor at $t_2$. By the time the cancellation phasor reaches the memory 104 at $t_6$, the cancellation phasor has rotated to be identical to the interference phasor at $t_1$, effectively doubling the radio frequency interference (RFI) generated by the data pattern, rather than mitigating the RFI.

Good mitigation performance can only be achieved if the interference and cancellation phasors retain their intended relative phase to within a small fraction of $\pi$. This phase constraint is expressed by Equation 2.

$$|\Delta\emptyset|=2\pi f_{radio}\cdot\Delta t<<\pi \quad \text{(Eq. 2)}$$

To meet this requirement at all points along a bus having propagation velocity v, the bus length must satisfy Equation 3.

$$L << \frac{v}{(4 \cdot f_{radio})} \quad \text{(Eq. 3)}$$

This restriction can generally be met only in lower radio bands and with very short buses. Many modern systems cannot satisfy these constraints.

However, by anticipating the propagation delay of the bus and applying a phase correction factor, radio interference originating with bus data sent from the memory end of the bus can be effectively cancelled with encoding techniques applied at the memory controller end of the bus. The encoding phase correction factor can be set from the known or measured characteristics of the bus or the phase correction factor can be determined by optimizing the interference cancellation. This technique is illustrated by model 204.

In this model 204, the data pattern is transmitted from the memory 104 to the memory controller 110. The interference phasor is illustrated from $t_1$ to $t_3$, as in the model 202. However, a phase correction factor is applied so that the cancellation pattern is chosen to mitigate emissions from the center of the bus, rather than from the memory controller end of the bus. As illustrated by the model 204, the interference phasor at time $t_2$ is cancelled by the cancellation phasor from the cancellation pattern at $t_5$. In addition, the cancellation phasor at $t_4$ cancels the interference phasor at $t_1$ and the mitigation phasor at $t_6$ cancels the data phasor at $t_3$. Including a phase correction factor of $\emptyset_{Corr} = -2\pi f_{radio} \cdot t_{PD}$ in the normal unidirectional encoding calculations accomplishes this correction. The length constraint of Equation 3 is therefore avoided and only the delay constraint must be met. The delay constraint requires that $t_{C-I} = t_{PD} + t_{T4}$ be less than a radio symbol time, which is typically in the microsecond to millisecond range.

The effective center of the bus, from an interference perspective, may not be its center from the perspective of physical dimensions or electrical propagation delay. For example, if coupling to the radio from one end of the bus is stronger than that from the other, then the effective center is closer to the strongly coupled end. The cancellation will not be perfect in such cases, but the phase correction factor can still be chosen to maximize the interference cancellation. The best phase correction factor can be determined from knowledge of the bus and its interference coupling, by in-system measurement of bus propagation delay, or by an optimization algorithm using a signal, such as a radio received signal strength indicator (RSSI) or other measure of interference level.

Differences in drive amplitude and signal integrity for data patterns driven from opposite ends of the data bus can impose additional limits on the RFI mitigation. For example, a 5% mismatch in drive amplitude between drivers at opposite ends of a bus theoretically limits mitigation to 26 dB. The phase correction offset can be used to partially compensate for this effect if needed.

The phase correction offset can also be used to compensate for the effects of other practical bus characteristics that might limit the cancellation in extreme cases. Such effects include spread spectrum clocking, poor signal duty cycle, mismatch between rising and falling signal edge shapes, slow edge settling times and impedance mismatches, among others.

It is to be understood the block diagram of FIG. 2 is not intended to indicate that the computing system 200 is to include all of the components shown in FIG. 2 in every case. Further, any number of additional components can be included within the computing system 200, depending on the details of the specific implementation.

Figure 3:
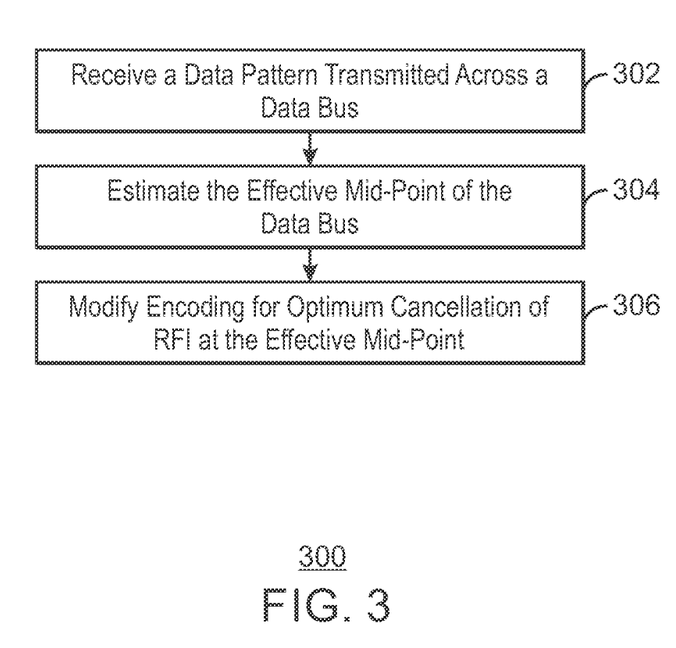
FIG. 3 is a process flow diagram of an example of a method of uni-directionally cancelling radio frequency interference (RFI)

FIG. 3 is process flow diagram of a method of uni-directionally cancelling radio frequency interference (RFI). In an example, the method can be implemented by the computing system 100 described with respect to FIG. 1. At block 302, a data pattern transmitted across a data lane can be received. The data pattern can be received in a component of the computing system, such as in a memory controller or a processor, among others. The data pattern can be transmitted across any suitable type of data bus. The data pattern can produce radio frequency interference (RFI) as it is transmitted across the data bus.

At block 304, the effective mid-point of the data bus can be estimated. The effective mid-point of the data bus is the point corresponding to a phase correction factor yielding optimal RFI cancellation. An interference mitigator can estimate the effective mid-point of the data bus. The interference mitigator can be included in the component of the computing system that is receiving the data pattern. In an example, the effective mid-point of the data bus can coincide with the physical and/or electrical mid-point of the data bus. In another example, the effective mid-point of the data bus does not coincide with the physical and/or electrical mid-point of the data bus.

At block 306, the interference mitigator can modify encoding for optimum cancellation of RFI at the effective mid-point. The encoding is adapted to cancel radio frequency interference by transmitting a cancellation pattern back across the data bus to the component from which the data pattern originated. The encoding is modified to optimally cancel the interference at the effective mid-point of the data bus, rather than at the data pattern receiving end of the data bus by anticipating the propagation delay of the data bus. The encoding is modified by applying a phase correction factor to the encoding. The phase correction factor can be set from the known or measured characteristics of the bus or the phase correction factor can be determined by optimizing the interference cancellation.

It is to be understood the process flow diagram of FIG. 3 is not intended to indicate that the method 300 is to include all of the blocks shown in FIG. 3 in every case. Further, any number of additional blocks can be included within the method 300, depending on the details of the specific implementation.

Figure 4:
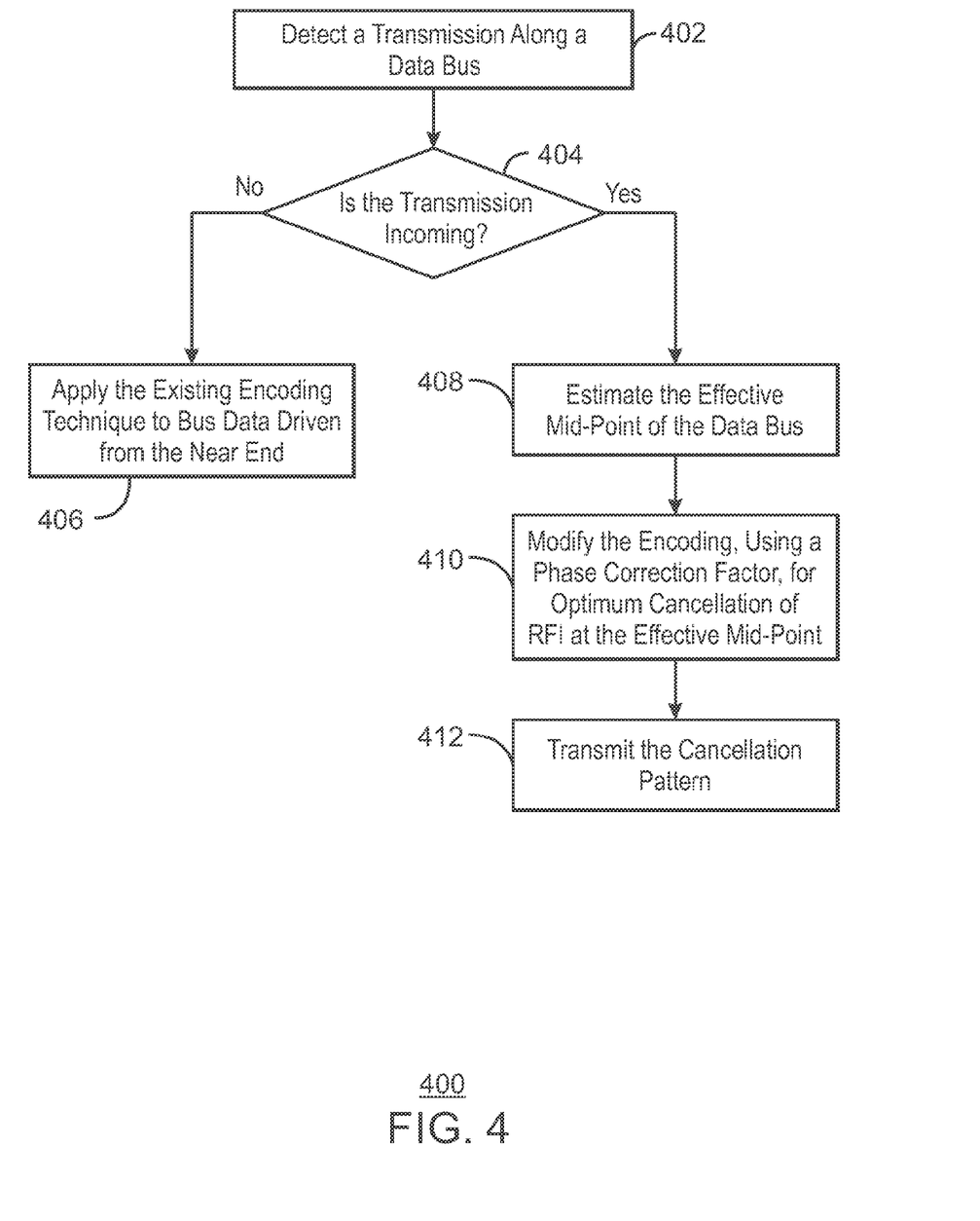
FIG. 4 is a process flow diagram of another example of a method of uni-directionally cancelling radio frequency interference (RFI).

FIG. 4 is a process flow diagram of another method of uni-directionally cancelling radio frequency interference (RFI). At block 402, transmission of data along a data bus can be detected. For example, the transmission can be detected when the transmission is received at the receiving component of the computing system. For example, the transmission can be received in a memory controller. At block 404, an interference mitigator can determine if the transmission is incoming. The interference mitigator can be included in a single component of the computing system, such as in the receiving component, or an interference mitigator can be included in multiple components of the computing system. If the transmission is not incoming (i.e., is outgoing), at block 406, the existing encoding technique can be applied to bus data driven from the near end of the data bus.

If the transmission is incoming, at block 408, the interference mitigator can estimate the effective mid-point of the data bus can be estimated. The effective mid-point of the data bus is the point corresponding to a phase correction factor yielding optimal RFI cancellation. An interference mitigator can estimate the effective mid-point of the data bus. The interference mitigator can be included in the component of the computing system that is receiving the data pattern. In an example, the effective mid-point of the data bus can coincide with the physical and/or electrical mid-point of the data bus. In another example, the effective mid-point of the data bus does not coincide with the physical and/or electrical mid-point of the data bus.

At block 410, the interference mitigator can modify encoding for optimum cancellation of RFI at the effective mid-point. The encoding is adapted to cancel radio frequency interference by transmitting a cancellation pattern back across the data bus to the component from which the data pattern originated. The encoding is modified to optimally cancel the interference at the mid-point of the data bus, rather than at the data pattern receiving end of the data bus by anticipating the propagation delay of the data bus. The encoding is modified by applying a phase correction factor to the encoding. The phase correction factor can be set from the known or measured characteristics of the bus or the phase correction factor can be determined by optimizing the interference cancellation. By modifying the encoding, a cancellation pattern is selected or created that optimally cancels RFI at the effective mid-point of the data bus. At block 412, the cancellation pattern is transmitted along the data bus in the direction opposite to the direction of travel of the original transmission. This cancellation pattern cancels interference generated by the transmission.

It is to be understood the process flow diagram of FIG. 4 is not intended to indicate that the method 400 is to include all of the blocks shown in FIG. 4 in every case. Further, any number of additional blocks can be included within the method 400, depending on the details of the specific implementation.

Example 1

An integrated circuit chip is described herein. The integrated circuit chip includes an interference mitigator to modify encoding to generate a cancellation pattern for optimum cancellation of radio frequency interference (RFI) at an effective mid-point of a data bus. The interference mitigator is also to transmit the generated cancellation pattern across the data bus to cancel the radio frequency interference.

The data bus can be a bi-directional data bus. A cancellation pattern to a first side of the effective mid-point is to cancel interference to a second side of the effective mid-point and a cancellation pattern to the second side of the mid-point is to cancel interference to the first side of the mid-point. The effective mid-point of the data bus may not coincide with a physical and/or electrical mid-point of the data bus. The cancellation pattern can be selected to cancel the radio frequency interference. The cancellation pattern can be transmitted across the data bus in a direction opposite to a direction of travel of the data to cancel the radio frequency interference. A phase correction factor can be applied to modify the encoding by anticipating a propagation delay of the data bus.

Example 2

A computing system is described herein. The computing system includes a data bus including a plurality of signal lines, the bus to transmit data along the signal lines. The computing system also includes an interference mitigator coupled to the signal lines of the data bus. The interference mitigator is to modify encoding to generate a cancellation pattern for optimum cancellation of radio frequency interference (RFI) at an effective mid-point of the data bus. The interference mitigator is also to transmit the generated cancellation pattern across the data bus to cancel the radio frequency interference.

A phase correction factor can be applied to modify the encoding by anticipating a propagation delay of the data bus. The cancellation pattern can be transmitted across the data bus in a direction opposite to a direction of travel of the data to cancel the radio frequency interference. The interference mitigator can be to estimate an effective mid-point of the data bus. The effective mid-point of the data bus may not coincide with a physical and/or electrical mid-point of the data bus. A cancellation pattern to a first side of the effective mid-point can be to cancel interference to a second side of the effective mid-point and a cancellation pattern to the second side of the mid-point can be to cancel interference to the first side of the mid-point. The data bus can be a bi-directional data bus.

Example 3

A computing system is described herein. The computing system includes logic to receive a data pattern transmitted across a data bus. The computing system also includes logic to modify encoding to generate a cancellation pattern for optimum cancellation of radio frequency interference (RFI) at an effective mid-point of the data bus.

A phase correction factor can be applied to modify the encoding by anticipating a propagation delay of the data bus. The cancellation pattern can be transmitted across the data bus in a direction opposite to a direction of travel of the data to cancel the radio frequency interference. The cancellation pattern can be selected to cancel the radio frequency interference. The effective mid-point of the data bus may not coincide with a physical and/or electrical mid-point of the data bus. The cancellation pattern to a first side of the effective mid-point can cancel interference to a second side of the effective mi-point and a cancellation pattern to the second side of the mid-point can cancel interference to the first side of the mid-point. The data bus can include a bi-directional data bus.

In the foregoing description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. An integrated circuit chip, comprising:
   an interference mitigator to:
      modify encoding to generate a cancellation pattern for optimum cancellation of radio frequency interference (RFI) at an effective mid-point of a data bus; and
      transmit the generated cancellation pattern across the data bus to cancel the radio frequency interference, wherein a direction of the cancellation pattern is based on a direction of a data pattern.

2. The integrated circuit chip of claim 1, wherein the data bus comprises a bi-directional data bus.

3. The integrated circuit chip of claim 1, wherein a cancellation pattern to a first side of the effective mid-point is to cancel interference to a second side of the effective mid-point and a cancellation pattern to the second side of the mid-point is to cancel interference to the first side of the mid-point.

4. The integrated circuit chip of claim 1, wherein the effective mid-point of the data bus does not coincide with a physical and/or electrical mid-point of the data bus.

5. The integrated circuit chip of claim 1, wherein the cancellation pattern is generated to cancel the radio frequency interference.

6. The integrated circuit chip of claim 1, wherein the cancellation pattern is to be transmitted across the data bus in a direction opposite to a direction of travel of the data to cancel the radio frequency interference.

7. The integrated circuit chip of claim 1, wherein a phase correction factor is to be applied to modify the encoding by anticipating a propagation delay of the data bus.

8. A computing system, comprising:
   a data bus comprising a plurality of signal lines, the bus to transmit data along the signal lines; and
   an interference mitigator coupled to the signal lines of the data bus, the interference mitigator to:
      modify encoding to generate a cancellation pattern for optimum cancellation of radio frequency interference (RFI) at an effective mid-point of the data bus; and
      transmit the generated cancellation pattern across the data bus to cancel the radio frequency interference, wherein a direction of the cancellation pattern is based on a direction of a data pattern.

9. The computing system of claim 8, wherein a phase correction factor is to be applied to modify the encoding by anticipating a propagation delay of the data bus.

10. The computing system of claim 8, wherein the cancellation pattern is to be transmitted across the data bus in a direction opposite to a direction of travel of the data to cancel the radio frequency interference.

11. The computing system of claim 8, wherein the interference mitigator is to estimate an effective mid-point of the data bus.

12. The computing system of claim 8, wherein the effective mid-point of the data bus does not coincide with a physical and/or electrical mid-point of the data bus.

13. The computing system claim 8, wherein a cancellation pattern to a first side of the effective mid-point is to cancel interference to a second side of the effective mid-point and a cancellation pattern to the second side of the mid-point is to cancel interference to the first side of the mid-point.

14. The computing system of claim 8, wherein the data bus comprises a bi-directional data bus.

15. A computing system, comprising:
   a receiving component to receive a data pattern transmitted across a data bus; and
   logic to modify encoding to generate a cancellation pattern for optimum cancellation of radio frequency interference (RFI) at an effective mid-point of the data bus, wherein a direction of the cancellation pattern is based on a direction of the data pattern.

16. The computing system of claim 15, wherein a phase correction factor is to be applied to modify the encoding by anticipating a propagation delay of the data bus.

17. The computing system of claim 15, wherein the cancellation pattern is to be transmitted across the data bus in a direction opposite to a direction of travel of the data to cancel the radio frequency interference.

18. The computing system of claim 15, wherein the cancellation pattern is generated to cancel the radio frequency interference.

19. The computing system of claim 15, wherein the effective mid-point of the data bus does not coincide with a physical and/or electrical mid-point of the data bus.

20. The computing system claim 15, wherein a cancellation pattern to a first side of the effective mid-point is to cancel interference to a second side of the effective mid-point and a cancellation pattern to the second side of the mid-point is to cancel interference to the first side of the mid-point.

21. The computing system of claim 15, wherein the data bus comprises a bi-directional data bus.

22. The computing system of claim 15, further comprising logic to estimate an effective mid-point of the data bus.

\* \* \* \* \*